_United States Patent Office_

3,258,350
Patented June 28, 1966

3,258,350
FUSION SEALS AND THEIR PRODUCTION
Francis W. Martin, Painted Post, and Frank Zimar, Hammondsport, N.Y., assignors to Corning Glass Works, Corning, N.Y., a corporation of New York
No Drawing. Filed Feb. 12, 1965, Ser. No. 432,415
6 Claims. (Cl. 106—47)

This application is a continuation-in-part of earlier application S.N. 17,788, filed March 28, 1960, now abandoned.

This invention relates to fusion seals of the type employed to assemble preformed components into a composite article and to materials and means for producing such seals.

The major components of a composite article, such as the funnel and panel of a cathode ray tube, may be preformed from glass, ceramic, or metal materials. These preformed parts may then be assembled into a composite article without distortion by means of a soft intermediate glass commonly known as a solder sealing glass. In like manner, an electronic component may be encapsulated or sealed within such a solder glass.

A solder sealing glass normally has a thermal coefficient of expansion compatible with the component substrate to which it is sealed, but a sealing temperature below the deformation or softening temperature of such component material. Lead borosilicate solder sealing glasses are described in United States Patent No. 2,642,633, issued to R. H. Dalton. A family of lead-zinc-borate solder glasses is set forth in British Patent No. 634,548.

Devitrified glass seals in which a fused sealing glass is at least partially crystallized by devitrification, and lead-zinc-borate glasses adapted to such devitrified glass seal production, have been proposed in United States Patent No. 2,889,952, issued to S. A. Claypoole. This sealing technique is particularly desirable in the production of evacuated electron tubes and the like. The glass seal may be produced at a relatively low temperature with the sealing material being converted by devitrification to a material of crystalline character that may withstand considerably higher temperatures without softening or flowing.

Certain factors may limit the general adaptability of such fusion sealing techniques and the sealing glasses employed in carrying them out. For example, the diversity of materials employed in component production, particularly in the electrical and electronic field, presents a variety of optimum conditions for sealing such materials. Of particular concern is the necessity for compatible thermal expansion coefficients between the sealing material and the surfaces being sealed. Not infrequently, the amount of sealing material required for a particular application is so small as to render impractical the development of a new glass for such application. A further problem arises from the desire to employ minimum sealing temperatures in the production of many electronic parts both to avoid thermal damage of sensitive materials and to permit concurrent sealing and bake out operations. In addition to these factors, there is an ever present desire for sealing materials and intermediate seals having greater mechanical strength.

It is a primary purpose of this invention to provide improved fusion-type seals and sealing materials which minimize these problems in prior fusion sealing materials. A further purpose is to provide a more flexible sealing material and method of sealing. Another purpose is to provide means for readily modifying the expansion characteristics of a particular soft sealing glass. A further purpose is to produce a fusion-type seal having improved mechanical strength.

An improved fusion-type seal in accordance with this invention is composed of a fused solder sealing glass, selected from the group consisting of lead borosilicate and lead-zinc-borate glasses having a sealing temperature below the deformation temperature of the seal substrate and a thermal coefficient of expansion of at least $80 \times 10^{-7}$, and a refractory material inert to the sealing glass and dispersed therein and consisting of zircon in an amount up to about 35% by volume.

In general, any of the known solder sealing glasses can be employed for present sealing purposes, including any of the stable and thermally devitrifiable glasses referred to earlier. However, the invention is particularly well adapted to a thermally devitrifiable glass sealing process inasmuch as it is conventional practice to reduce such glasses to a comminuted or finely divided form prior to forming a fusion seal. In carrying out the present invention, the glass milling or grinding step is modified to the extent of incorporating the desired amount of refractory material, in the nature of a mill addition, and forming an intimate mixture of the two materials.

Among the refractory oxides and silicates, zircon is particularly adapted to present purposes because of its relatively low thermal expansion coefficient (about $39 \times 10^{-7}$), isotropic crystalline nature, inertness to glass solution and high modulus of elasticity. Its low thermal expansion coefficient adapts it to incorporation with higher expansion coefficient sealing glasses, that is sealing glasses having expansion coefficients of $80 \times 10^{-7}$ and above, to modify such glasses for particular sealing applications. Thus, in accordance with this invention, a sealing glass having a thermal expansion coefficient of about 100 may be readily adapted to, or rendered compatible with, parts having expansion coefficients of 85 to $100 \times 10^{-7}$ merely by suitably varying the amount of zircon incorporated with such glass in preparing a sealing material.

It has previously been proposed to incorporate crystalline refractory materials with glasses to render such glasses resistant to deforming flow at elevated temperatures. Contrary to what might be expected then, we have found that up to about 10% of zircon may be mixed with a solder sealing glass without appreciably affecting the sealing temperature and flow characteristics of the glass. As the amount added becomes increasingly greater than 10%, the ability of the mixture to flow into a well formed seal at the glass sealing temperature gradually diminishes. With more than 20% zircon in a sealing mixture normal flow is essentially lost at the base glass sealing temperature. However, where flow is not a requisite, or where external pressure can be applied, adhesion can be obtained with a mixture containing up to about 35%. In general, stable sealing glasses are capable of receiving larger refractory additions before sealing characteristics are impaired. Thus the maximum amount of zircon additive that can be tolerated in any given sealing application will depend to some extent on the glass employed, but for the most part on the degree of flow required in producing a particular seal. It will be understood that reference to percentages is in terms of volume percent throughout this specification unless otherwise indicated.

A particularly important feature of the invention derives from our discovery that the strength of a fusion seal may be increased markedly by an addition of zircon. In this connection, seal strength is measured in terms of material modulus of rupture (M.O.R.) by conventional measurement methods. The explanation of this strength phenomenon is not entirely clear. Ordinarily, inclusion of a foreign material in discrete particles may be expected to produce a weaker product. This is particularly true where the materials involved differ markedly in expansion coefficient. It appears, however, that the high strength characteristic of the refractory material is imparted to the glass-refractory mixture. This may be due to the relatively high modulus of elasticity of the refractory material.

The various features of the invention and the benefits which it provides are more fully set forth in the following specific exemplary illustrations.

*Example I*

The following table sets forth the calculated compositions in percent by weight, and physical properties, of two typical thermally devitrifiable glass compositions:

|  | X | Y |
|---|---|---|
| PbO | 76 | 83.5 |
| ZnO | 11 | 7.5 |
| $B_2O_3$ | 9 | 7.5 |
| BaO | 2 | |
| $SiO_2$ | 2 | 1.5 |
| Expansion coefficient $\times 10^{-7}$ (0–300° C.) | 103 | 115 |
| Softening point | 366 | 336 |

Each glass may be sealed to a base glass having a compatible thermal coefficient of expansion and a relatively higher softening point. Glass X is converted to a thermally devitrified seal by heating at 440° C. for about one hour. A comparable seal is produced with glass Y by heating for one-half hour at 420° C.

An intimately mixed sealing material was produced by milling 100 parts of glass Y with 10 parts zircon, both by volume. This mixture was suspended in an organic vehicle and applied to the surface of a relatively high softening point base glass having an expansion of $99 \times 10^{-7}$. Heating at 420° C. for a half hour produced a thermally devitrified glass-zircon material sealed to the base glass. An essentially identical seal was produced in similar manner between glass X, without any refractory additive, and the same base glass. Examination showed the expansion match in each seal to be essentially the same. This illustrates the desirable thermal expansion and sealing temperature modifications provided by the invention.

*Example II*

A stable sealing glass, that is one adapted to sealing without devitrifying, was formulated with the following composition: 82% PbO, 10% $B_2O_3$, 5% $SiO_2$ and 3% $Al_2O_3$. Mixtures of this glass with zircon were produced by ball milling, and expansion coefficients determined for the resulting mixtures, as follows.

| Percent zircon: | Expansion $\times 10^{-7}$ (25–320° C.) |
|---|---|
| 0 | 114 |
| 13 | 98 |
| 20 | 90 |
| 26 | 84 |

The last mixture showed little tendency to flow but did produce an adherent seal on glass. This indicates the somewhat greater capacity of a stable sealing glass for a refractory addition.

*Example III*

Sealing compositions were prepared by mixing zircon with devitrifiable glasses having the following compositions:

|  | A | X |
|---|---|---|
| PbO | 76.5 | 76 |
| ZnO | 11 | 11 |
| $B_2O_3$ | 9.1 | 9 |
| $SiO_2$ | 2.4 | 2 |
| BaO | | 2 |
| $Al_2O_3$ | 1 | |

The resulting mixtures were pressed in rectangular block form, heated to the glass sealing temperature of about 450° C. and held to obtain glass devitrification. The blocks were then cut into small bars ¼″ x ¼″ by 2¼″. Modulus of rupture measurements were made on groups of such bars from each composition, the number of samples in each group being at least six. The following table shows compositions in terms of glass and percent zircon addition with average modulus of rupture (M.O.R.) values in p.s.i. as measured at room temperature (R.T.) and 400° C.

| Composition | M.O.R. (R.T.) | M.O.R. (400° C.) |
|---|---|---|
| X+0% | 4,700 | 4,800 |
| X+2½% | 5,900 | 5,600 |
| X+5% | 6,700 | 6,600 |
| X+10% | 5,400 | 5,300 |
| A+0% | 4,300 | 3,100 |
| A+5% | 6,100 | 4,900 |
| A+10% | 7,000 | 6,100 |

*Example IV*

A quantity of glass A of Example III was milled and portions of the milled glass intimately mixed with pulverized zircon and a fugitive vehicle to produce three separate sealing mixtures. The zircon fractions in these mixtures, in terms of percent by weight and by volume of the total solids content, were as follows:

| Mixture | Wt. Percent | Vol. Percent |
|---|---|---|
| 1 | 15 | 20 |
| 2 | 20 | 26 |
| 3 | 25 | 32 |

A sandwich type assembly was produced with each sealing mixture by forming three drops or beads of the mixture in spaced relation between inch squares of a $Na_2O$–$Al_2O_3$–$B_2O_3$–$SiO_2$ glass having an expansion coefficient of about $60 \times 10^{-7}$. Each sandwich assembly was then placed in a furnace operating at 400° C. and a weight of about 80 grams placed over the assembly to apply pressure during the thermal sealing cycle.

The assemblies were left in the furnace for a period of 15 minutes, then removed and cooled. With this sealing schedule, the sealing glass mixtures softened and wet the glass substrates to form seals, but underwent relatively little devitrification. In order to devitrify the glass, it is customary to heat it at 450° C. for a period of about 30 minutes.

Examination of the sandwich type seal revealed that a glass-glass seal had resulted in each instance. However, when a separating force was applied between the glass squares in each assembly, it was observed that the sealing mixtures containing 20 and 26% zircon by volume had formed relatively tight strong seals, whereas the third mixture (that with 32% by volume) readily separated at the interface between the substrate glass and the sealing glass. This indicated that the amount of zircon in the third mixture was sufficient to interfere with the flow and/or wetting of the sealing glass to such an extent as to give a weak seal. This would further indicate that, even in seals produced with applied pressure, the maximum amount of zircon that can be introduced while still obtaining some degree of sealing is about 35% by volume.

We claim:

1. An improved fusion-type seal composed of a fused solder sealing glass, said glass being selected from the group consisting of lead borosilicate and lead-zinc-borate glasses having a sealing temperature below the deformation temperature of the material to which it is sealed and a thermal coefficient of expansion of at least $80 \times 10^{-7}$, and a refractory material inert to the sealing glass and dispersed therein, said refractory material consisting of zircon in an amount up to about 35% by volume.

2. A seal in accordance with claim 1 wherein the refractory is present in an amount up to about 20% by volume.

3. A composite article comprising at least one preformed component and a fusion-type seal composed of a fused solder sealing glass, said sealing glass being selected from the group consisting of lead borosilicate and lead-zinc-borate glasses having a sealing temperature below the deformation temperature of the component to which it is sealed and a thermal coefficient of expansion of at least $80 \times 10^{-7}$, and a refractory material inert to said sealing glass and dispersed therein, said refractory material consisting of zircon in an amount up to about 35% by volume.

4. A composite article in accordance with claim 3 comprising at least two preformed components with the fusion-type seal therebetween.

5. An intimately mixed sealing material in comminuted form comprising a solder sealing glass selected from the group consisting of lead borosilicate and lead-zinc-borate glasses having a thermal expansion coefficient of at least $80 \times 10^{-7}$ and zircon present in an amount up to about 35% by volume.

6. A mixture in accordance with claim 5 wherein the zircon is present in an amount up to about 20% by volume.

No references cited.

TOBIAS E. LEVOW, *Primary Examiner.*

H. M. McCARTHY, *Assistant Examiner.*